(12) United States Patent
Malot et al.

(10) Patent No.: US 10,113,506 B2
(45) Date of Patent: Oct. 30, 2018

(54) NOZZLE FOR AN AIRCRAFT TURBOPROP ENGINE WITH AN UNDUCTED FAN

(71) Applicant: AIRCELLE, Gonfreville l'Orcher (FR)

(72) Inventors: Hélène Malot, Sainte Adresse (FR); Jean-Pierre Guegou, Mannevillette (FR); Philippe Bienvenu, Montivilliers (FR); Philippe Prunin, Montivilliers (FR)

(73) Assignee: AIRCELLE, Gonfreville l'Orcher (FR)

( * ) Notice: Subject to any disclaimer, the term of this patent is extended or adjusted under 35 U.S.C. 154(b) by 318 days.

(21) Appl. No.: 14/881,886

(22) Filed: Oct. 13, 2015

(65) Prior Publication Data

US 2016/0032863 A1 Feb. 4, 2016

Related U.S. Application Data

(63) Continuation of application No. PCT/FR2014/050919, filed on Apr. 15, 2014.

(30) Foreign Application Priority Data

Apr. 15, 2013 (FR) ...................................... 13 53391

(51) Int. Cl.
*F01D 25/24* (2006.01)
*F02K 1/28* (2006.01)
(Continued)

(52) U.S. Cl.
CPC ................ *F02K 1/28* (2013.01); *F01D 25/24* (2013.01); *F02C 3/067* (2013.01); *F02K 1/822* (2013.01);
(Continued)

(58) Field of Classification Search
CPC ... F02K 1/28; F02K 1/822; F02K 3/06; F02K 3/072; F01D 25/24; F01D 25/26;
(Continued)

(56) References Cited

U.S. PATENT DOCUMENTS 2,599,879 A    6/1952  Walker
2,672,728 A *  3/1954  Stockdale ............... F23R 3/002
                                                        60/757
(Continued)

FOREIGN PATENT DOCUMENTS

FR    1 152 078    9/1954
FR    2 216 450 A1 8/1974
(Continued)

OTHER PUBLICATIONS

International Search Report dated Jul. 17, 2014 in International Application No. PCT/FR2014/050919.
(Continued)

*Primary Examiner* — Logan Kraft
*Assistant Examiner* — Brian Delrue
(74) *Attorney, Agent, or Firm* — Burris Law, PLLC

(57) ABSTRACT

The present disclosure provides a nozzle for an aircraft turboprop engine with an unducted fan, including: an inner wall, an outer wall radially spaced apart from the inner wall and concentric with the inner wall, a junction area of the inner and outer walls including an opening contained in a plane transverse to a longitudinal axis of the nozzle. In particular, the junction area of the inner and outer walls includes two connecting plates and a member to secure the two connecting plates together, or in another form, the junction area includes a pad secured to the inner wall, and a pad secured to the outer wall, facing the pad of the inner wall of the nozzle.

9 Claims, 4 Drawing Sheets

(51) Int. Cl.
*F02K 1/82* (2006.01)
*F02K 3/072* (2006.01)
*F02C 3/067* (2006.01)
*F02K 3/06* (2006.01)

(52) U.S. Cl.
CPC ............... *F02K 3/06* (2013.01); *F02K 3/072* (2013.01); *Y02T 50/671* (2013.01); *Y02T 50/675* (2013.01)

(58) Field of Classification Search
CPC .......... F01D 25/28; F01D 25/30; F02C 3/067; Y02T 50/671; Y02T 50/675
USPC ........................................................ 415/213
See application file for complete search history.

(56) References Cited

U.S. PATENT DOCUMENTS

| | | | | |
|---|---|---|---|---|
| 2,722,801 A * | 11/1955 | Lombard | ............... | F02K 1/11 239/127.3 |
| 2,910,828 A * | 11/1959 | Meyer | ............... | F02K 1/123 239/455 |
| 3,603,082 A * | 9/1971 | Sneeden | ............... | F02C 3/045 60/226.1 |
| 3,612,400 A * | 10/1971 | Johnson | ............... | F02K 1/1269 239/265.19 |
| 3,712,062 A * | 1/1973 | Nash | ............... | F02K 1/822 60/266 |
| 3,726,091 A * | 4/1973 | Tontini | ............... | F02K 1/34 181/220 |
| 3,826,088 A * | 7/1974 | Nash | ............... | C07D 277/587 285/123.1 |
| 3,830,431 A * | 8/1974 | Schwartz | ............... | F02K 1/383 239/265.11 |
| 3,866,417 A * | 2/1975 | Velegol | ............... | F02K 1/82 60/266 |
| 3,946,830 A * | 3/1976 | Kutney | ............... | B64D 33/02 137/15.1 |
| 4,137,992 A * | 2/1979 | Herman | ............... | F02K 1/827 181/213 |
| 4,157,013 A * | 6/1979 | Bell, III | ............... | B60H 1/04 60/39.512 |
| 4,628,694 A * | 12/1986 | Kelm | ............... | B21D 35/00 60/752 |
| 5,557,932 A * | 9/1996 | Nash | ............... | F02K 1/822 60/266 |
| 7,866,141 B2 * | 1/2011 | Le Docte | ............... | F02K 1/822 181/220 |
| 9,149,997 B2 * | 10/2015 | Foster | ............... | F04D 29/023 |
| 9,188,024 B2 * | 11/2015 | Tardif | ............... | F01D 25/24 |

FOREIGN PATENT DOCUMENTS

| | | |
|---|---|---|
| FR | 2 873 167 A1 | 1/2006 |
| GB | 878 195 A | 9/1961 |
| GB | 2 174 762 A | 11/1986 |

OTHER PUBLICATIONS

"Radial Stretch Forming on Expanding Mandrel Machines", Machinery, Mar. 1, 1967, pp. 88-98, XP001334799.

* cited by examiner

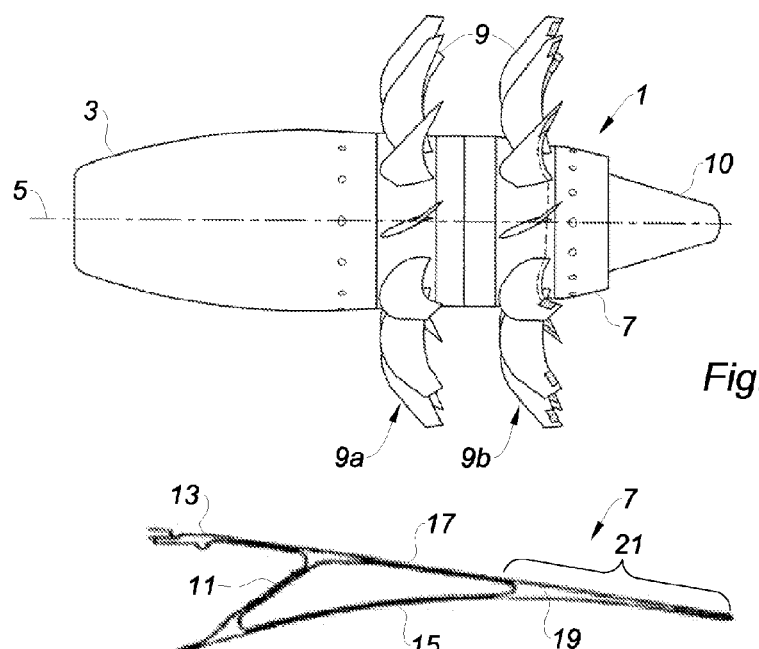
Fig. 1 "PRIOR ART"
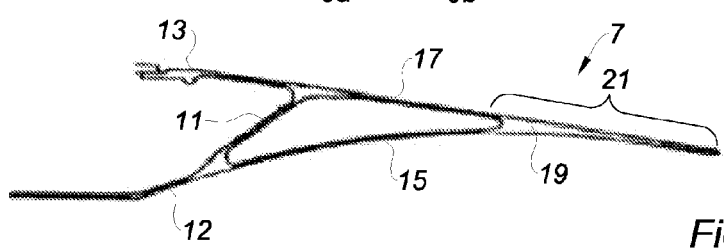
Fig. 2
"PRIOR ART"
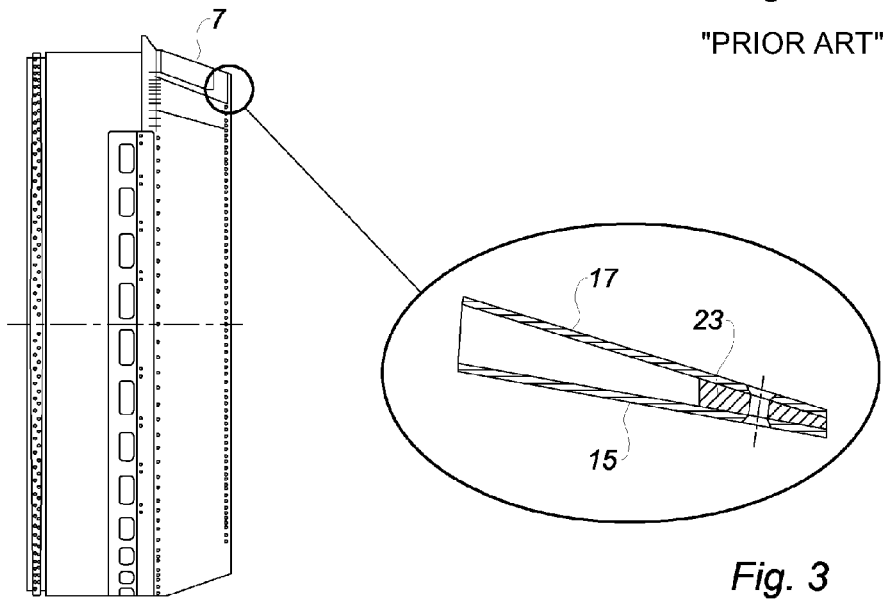
Fig. 3
"PRIOR ART"

section 6-6

NOZZLE FOR AN AIRCRAFT TURBOPROP ENGINE WITH AN UNDUCTED FAN

CROSS-REFERENCE TO RELATED APPLICATIONS

This application is a continuation of International Application No. PCT/FR2014/050919, filed on Apr. 15, 2014, which claims the benefit of FR 13/53391, filed on Apr. 15, 2013. The disclosures of the above applications are incorporated herein by reference.

FIELD

The present disclosure relates to aircraft turboprop engines with unducted fans, and more particularly to a rotary nozzle for such turboprop engines.

BACKGROUND

The statements in this section merely provide background information related to the present disclosure and may not constitute prior art.

Referring to FIG. 1 of French Patent No. 1 152 078, a turboprop engine with an unducted fan comprises a turboprop engine 1 and an annular nacelle 3, disposed coaxially with respect to the turboprop, around a longitudinal axis 5 of the turboprop engine.

The turboprop engine 1 comprises, from the upstream (on the left on FIG. 1) towards the downstream (on the right on FIG. 1) in the flow direction of the air, a compressor, a combustion chamber, a turbine with two counter-rotating rotors (these elements, housed in the nacelle 3, are not visible on this figure) and a nozzle 7 for ejecting the air flow crossing the turboprop engine. These upstream and downstream rotors each drive in rotation around the longitudinal axis 5 an upstream 9a and downstream 9b assembly of fan blades 9 located downstream of the turboprop engine 1.

The nozzle 7 for ejecting the air flow is called rotary, in that it is movable in rotation around the longitudinal axis 5 of the turboprop engine 1, with respect to a gas ejecting cone 10 substantially concentric with the nozzle 7. To this end, and as is visible more particularly on FIG. 2 schematically illustrating the nozzle 7 in longitudinal section, the upstream section 11 of the nozzle 7 is connected to a set of flanges 12, 13 respectively secured to the downstream rotor of the turboprop engine turbine (not represented) and rotary cowls assembled around fan blades 9b (visible on FIG. 1).

As represented on FIG. 2, the nozzle 7, has a substantially triangular longitudinal section. The nozzle 7 comprises an inner wall 15 and an outer wall 17, each typically produced in Inconel.

The inner 15 and outer 17 walls are connected to each other thanks to a circular welding 19 extending over the entire circumference of the nozzle and defining an annular junction area 21 between the inner and outer walls downstream of the nozzle.

According to another type of nozzle, such as that illustrated on FIG. 3 representing a non-rotary nozzle for ejecting the primary air flow of a by-pass turbojet engine, the junction area between the inner 15 and outer 17 walls of the nozzle 7 comprises an annular wedge 23 disposed at the downstream section of the nozzle, between said inner and outer walls. The annular wedge 23 is sandwiched between the inner and outer walls. The annular wedge 23 is brazed on the inner wall 15 and assembled by riveting on the outer wall 17.

The purpose of the rotary and non-rotary nozzles allows the ejection of the hot air flow emanating from the turboprop engine.

However, whatever the type of nozzle retained, these nozzles generally have an annular junction area at the downstream section thereof. The hot air flow flowing along the inner wall of the nozzle diffuses heat between the inner and outer walls of the nozzle, thus leading to limiting the cooling capacities of the engine.

U.S. Pat. No. 2,599,879 provides an annular junction area between the inner and outer walls of the nozzle, constituted by an annular partition having openings through which ducts pass in which cold air circulates.

The advantage of this solution is to refresh the engine. However, the setting up of these ducts is particularly complex and considerably increases the mass of the nozzle.

SUMMARY

The present disclosure provides a nozzle for an aircraft turboprop engine with an unducted fan, comprising:
   an inner wall,
   an outer wall distant radially from said inner wall and concentric with said inner wall,
   a junction area of said inner and outer walls comprising at least one opening contained in a plane substantially transverse to a longitudinal axis of said nozzle,
   said nozzle being characterized in that the junction area of the inner and outer walls further comprises means selected from the following group comprising:
   means for connecting the walls of the nozzle, said means comprising, on the one hand, at least two connecting plates, and other hand, means for securing said plates together, or
   at least one pad secured to the inner wall and at least one pad secured to the outer wall of the nozzle and positioned facing said at least one pad of the inner wall of the nozzle.

By providing one or several openings in the junction area of the inner and outer walls of the nozzle, ventilation between said inner and outer walls is created, thus allowing providing a good ventilation of the engine.

By providing a junction area of the inner and outer walls comprising either means for connecting the walls of the nozzle, said means comprising, on the one hand, at least two connecting plates and, on the other hand, means for securing said plates together, either or at least one pad secured to the inner wall and at least one pad secured to the outer wall of the nozzle and positioned facing said pad of the inner wall of the nozzle, the nozzle comprising neither a circumferential annular junction area, nor pipes for cold air circulation.

As a result, the mass of the nozzle is reduced considerably while providing improved ventilation of the engine.

By thus reducing the mass of the nozzle, the fuel consumption of the propulsion assembly is also reduced.

According to a first form of the present disclosure, each of the walls of the nozzle comprises at least one metallic skin made of an austenite nickel-chromium based superalloys, for example Inconel.

The connecting means are distributed discretely on the circumference of the nozzle, between the inner and outer walls of the nozzle.

According to a second form of the present disclosure, the inner wall of the nozzle is constituted by a metallic skin made of an austenite nickel-chromium based superalloys, for example Inconel, and the outer wall of the nozzle is constituted by a skin in titanium.

This advantageously allows reducing the mass of the nozzle all the more with respect to the first form of the present disclosure.

According to other features, the pads of the inner wall have an abutment thereon, for example of carbon, thus inhibiting direct contact between the pads of the inner and outer walls, thus reducing the chance of premature wear of said pads.

According to a common variant to the two forms of the present disclosure, the inner wall comprises at least one annular stiffener positioned facing at least one annular stiffener of the outer wall, so as to improve the structural hold of the nozzle.

In one form, the junction area of the inner and outer walls is located at a downstream section of the nozzle.

According to the present disclosure, the metallic skin in Inconel of the inner and outer walls is obtained by a forging-die-stamping method, thus allowing very advantageously to do without longitudinal welding for forming each of the walls, but also the circular welding for assembling the parts constituting the walls. By producing the nozzle thanks to such a method, the mass of the nozzle is further reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 illustrates a turboprop engine with an unducted fan known from the prior art;

FIG. 2 is a schematic view in longitudinal section of the rotary nozzle according to the prior art;

FIG. 3 is a schematic view in longitudinal section of a portion of a non rotary nozzle according to the prior art;

Figure 4:
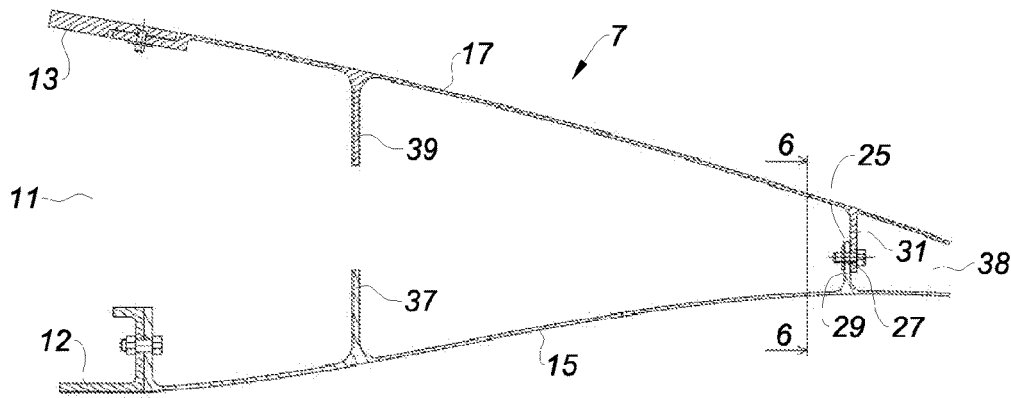
FIG. 4 illustrates a portion of the nozzle according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 4, a nozzle produced according to a first form of the present disclosure is illustrated as reference numeral 7.

The nozzle 7 comprises an inner wall 15 and an outer wall 17, typically produced in a material offering a good mechanical resistance at temperatures of around 600° Celsius at the inner wall, and of around 300° Celsius at the outer wall.

To this end, the inner and outer walls are constituted by metallic skins in Inconel, a material having an acceptable mechanical resistance up to 800° Celsius.

The upstream section 11 of the nozzle is connected to a set of flanges 12, 13 respectively secured to the downstream rotor of the turbine of the turboprop engine (not represented) and rotary cowls assembled around blades of a downstream fan. By way of example, the inner wall 15 is bolted on the flange 12 and the outer wall 17 is screwed on the flange 13.

According to the present disclosure, the downstream section 25 of the nozzle 7 comprises a junction area 27 of the inner and outer walls.

This junction area of the inner 15 and outer 17 walls comprises means for connecting walls of the nozzle, constituted by a plurality of connecting plates 29, 31.

The connecting plates 29 are secured to the inner wall 15 and oriented in the direction of the inside of the nozzle 7, and the connecting plates 31 are secured to the outer wall 17 and oriented in the direction of the inside of the nozzle 7.

Figure 5:
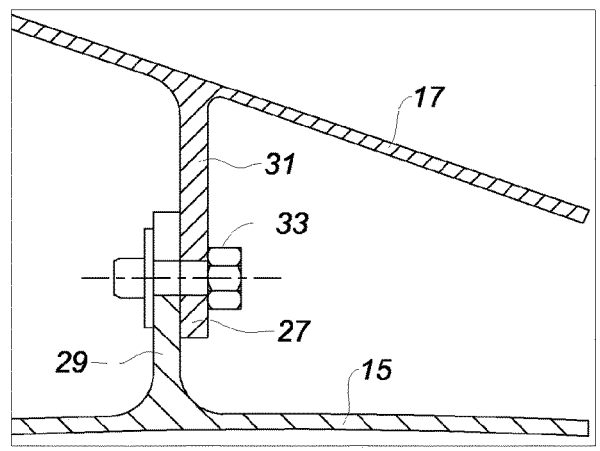
FIG. 5 is a detailed view of the junction area of the inner and outer walls of the nozzle.

The connecting means of the walls of the nozzle further comprise means for securing the plates 29, 31 to each other. By way of non-limiting example, these securing means comprise screws 33, such as represented in further detail on FIG. 5.

Figure 6:
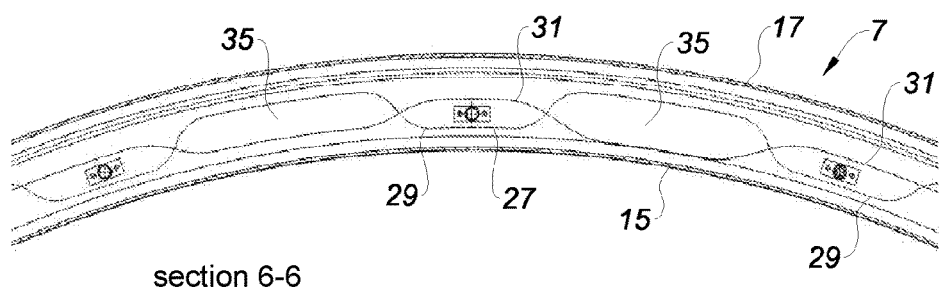
FIG. 6 illustrates a cross-section according to line 6-6 of the nozzle of FIG. 4.
Figure 7:
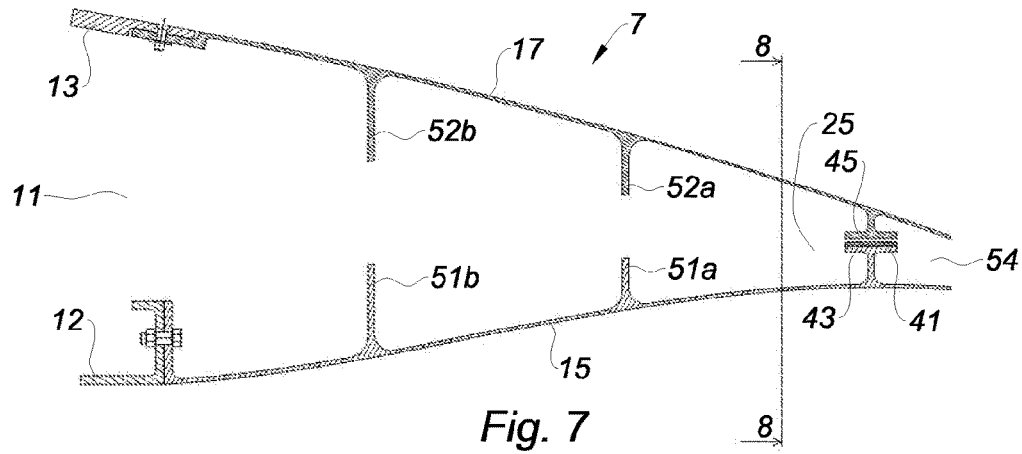
FIG. 7 represents a portion of the nozzle according to a second form of the present disclosure.
Figure 10:
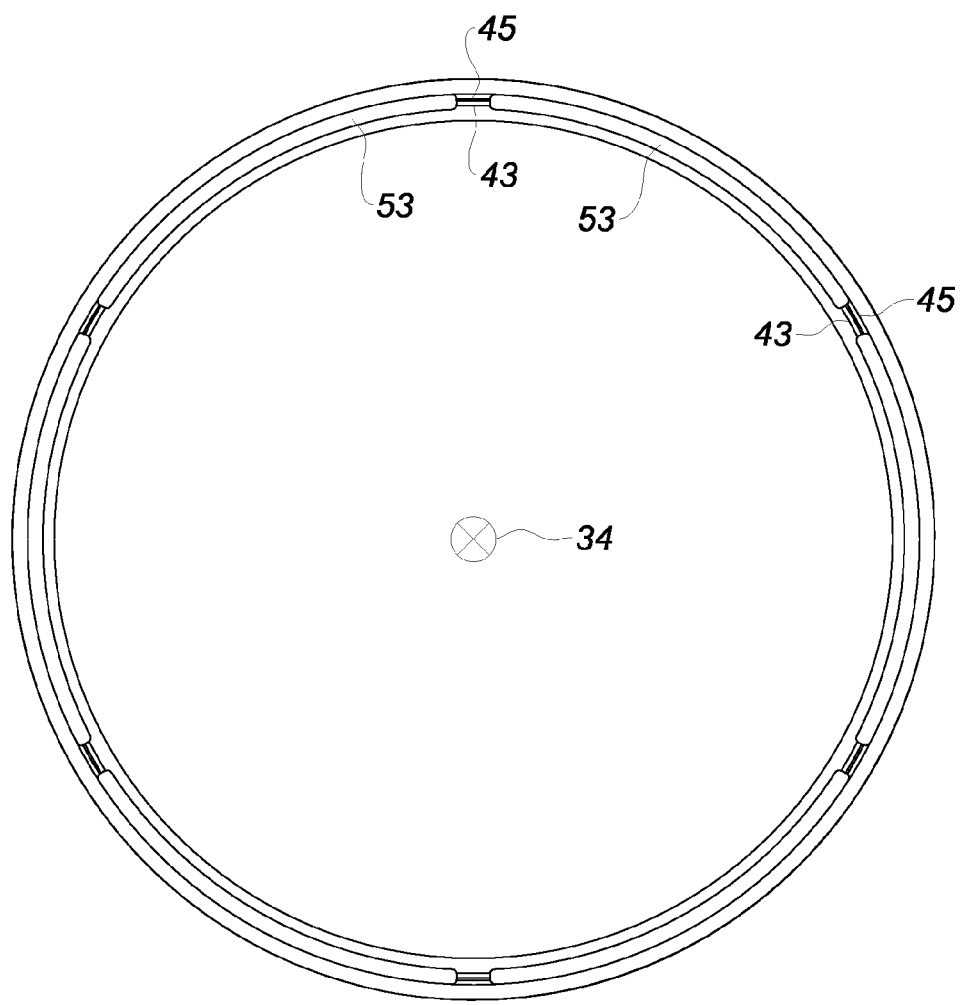
FIG. 10 illustrates the nozzle of the second form of the present disclosure, seen from the longitudinal axis of the nozzle.

Referring to FIG. 6, illustrating a sectional view according to line 6-6 defined on FIG. 4, the nozzle 7 according to the present disclosure comprises a plurality of openings 35 contained in a plane substantially transverse to a longitudinal axis 34 (visible on FIG. 10 of the nozzle. These openings 35 are interposed with the plates 29, 31 distributed discretely on the circumference of the nozzle.

Referring to FIG. 4, the trailing edge 38 of the nozzle is open, that is to say that the ends of the inner 15 and outer 17 walls are not connected to each other, thus allowing providing good ventilation between the walls.

In order to reinforce the structural hold of the nozzle, the inner 15 and outer 17 walls each comprise an annular stiffener 37, 39 disposed facing each other.

The nozzle according to the present disclosure is advantageously produced by a method of forging-die-stamping the inner and outer skins from a material such as an austenite nickel-chromium based superalloy, for example Inconel. This method allows advantageously does not require longitudinal and circular welding on the nozzle.

According to a second form of the nozzle according to the present disclosure, represented on FIGS. 7 to 10, the inner 15 and outer 17 walls are respectively constituted by a metallic skin made of an austenite nickel-chromium based superalloy (e.g., Inconel) and by a skin of titanium. The presence of an outer wall constituted by a skin of titanium allows reducing the mass of the nozzle with respect to the first form according to which the two walls of the nozzle are constituted by skins of Inconel.

As before, the upstream section 11 of the nozzle is connected to a set of flanges 12, 13 respectively secured to the downstream rotor of the turbine of the turboprop engine (not represented) and rotary cowls assembled around the blades of the downstream fan.

According to the present disclosure, the downstream section 25 of the nozzle 7 comprises a junction area 41 of the inner and outer walls.

This junction area of the inner 15 and outer 17 walls comprises a plurality of pads 43 secured to the inner wall 15 and a plurality of pads 45 secured to the outer wall 17.

In longitudinal section, each pad 43, 45 has a substantially T shape. Each pad 43 is positioned facing each pad 45.

Figure 9:
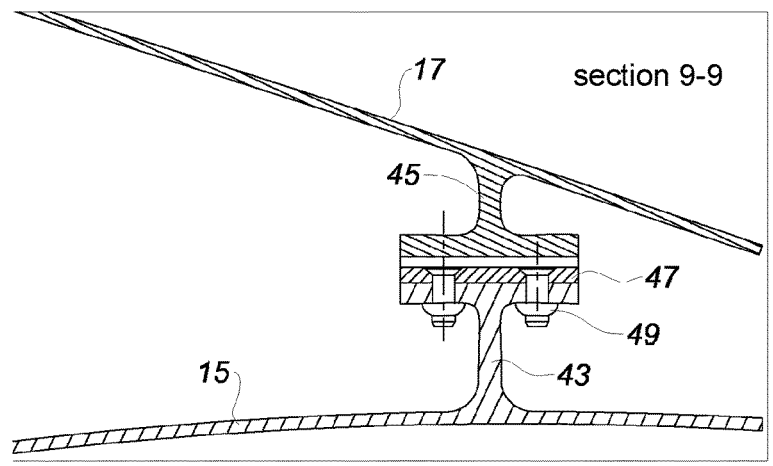
FIG. 9 is a sectional view according to line 9-9 of FIG. 8.

When the turboprop engine is at a standstill, the pads 45 of the outer wall 17 are facing the pads 43 of the inner wall 15, but are not in contact with each other, as visible on FIG. 9.

When the turboprop engine is in operation, the outer wall of the nozzle, constituted by a titanium skin, dilates more than the inner wall of the nozzle, constituted by a metallic skin of the austenite nickel-chromium based superalloy (e.g., Inconel), due to the difference between the coefficients of thermal expansion of titanium and Inconel. The outer wall is displaced towards the inner wall, thus leading to a displacement of the pads of the outer wall in the direction of the pads of the inner wall positioned facing each other, as a result creating a plurality of discrete connections (not represented) of "bearing plane" type between the pads of the outer wall and those of the inner wall.

In one form, an abutment 47, for example of carbon, is disposed between the pads 43 and 45, so as to allow the absorption of shocks between the pads, and as a result limit the wear of the pads. The abutment 47 is for example secured on the pad 43 of the inner wall 15 by means of a set of screws 49.

By providing a set of pads positioned so as to create a plurality of bearing plane connections between the inner wall and the outer wall of the nozzle, instead of plates bolted together as was the case in the first form, one is rid of the flow issues which may occur due to the difference between the coefficients of differential expansion between Inconel and titanium.

Furthermore, contrary to the previous form, no securing means between the inner and outer walls is provided.

In order to reinforce the structural hold of the nozzle, the inner 15 and outer 17 walls each comprise two annular stiffeners 51a, 51b, 52a, 52b disposed facing each other.

Figure 8:
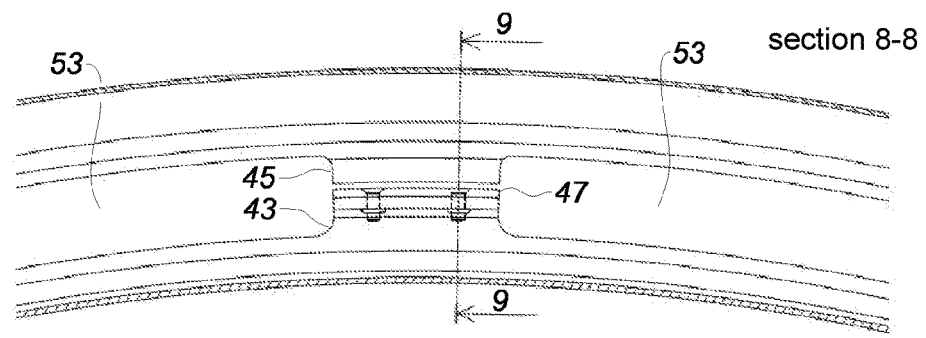
FIG. 8 illustrates a cross-section according to line 8-8 of the nozzle of FIG. 7.

According to the present disclosure, and by referring more particularly to FIGS. 8 and 10, the pads 43, 45 are distributed in a discrete manner on the circumference of the nozzle, thus allowing providing a plurality of openings 53 in a plane transverse to the longitudinal axis 34 of the nozzle.

By way of non limiting example, six openings 53 and six sets of pads 43, 45 are provided on the circumference of the nozzle.

The trailing edge 54 of the nozzle 7 (visible on FIG. 7) is, as previously, open, thus allowing providing good ventilation between the walls.

As previously, the inner wall of Inconel may be produced by a forging-die-stamping method.

Thanks to the present disclosure, the presence of a circumferential annular junction area is hence no longer necessary.

Thus, by ridding ourselves of such a circumferential annular junction area, need no longer remains for cold air flow circulation pipes provided in the prior art for refreshing the engine.

The mass of the nozzle is thereby reduced considerably while providing good ventilation of the engine, thus allowing to substantially reduce the fuel consumption, in particular of the "Open Rotor" type turboprop engines.

The present disclosure is not limited to the sole forms of this nozzle, described above by way of illustrating examples only, but on the other hand encompasses all the variants involving the technical equivalents of the means described as well as the combinations thereof if these fall within the scope of the present disclosure.

What is claimed is:

1. A nozzle for an aircraft turboprop engine with an unducted fan, comprising:
an inner wall,
an outer wall being radially spaced apart from the inner wall and concentric with the inner wall,
a junction area of the inner and outer walls, the junction area comprising a plurality of first pads secured to the inner wall, and a plurality of second pads secured to the outer wall and facing the plurality of first pads,
wherein the plurality of first and second pads are positioned such that the plurality of first pads and the plurality of second pads are not in contact with each other to define a plurality of gaps therebetween when the turboprop engine is at a standstill and such that the plurality of second pads move toward the plurality of first pads to close the gaps to create bearing plane connections therebetween when the turboprop engine is in operation, the junction area being disposed at a trailing edge of the nozzle and comprising at least one opening to create ventilation between the inner and outer walls, the inner and outer walls being inclined toward each other at the junction area.

2. The nozzle according to claim 1, wherein each of the inner and outer walls of the nozzle comprises at least one metallic skin made of an austenite nickel-chromium based superalloy.

3. The nozzle according to claim 1, wherein the bearing plane connections are distributed discretely along a circumference of the nozzle, between the inner and outer walls of the nozzle.

4. The nozzle according to claim 1, wherein the inner wall of the nozzle comprises a metallic skin made of an austenite nickel-chromium based superalloy, and the outer wall of the nozzle comprises a skin made of titanium.

5. The nozzle according to claim 1, further comprising abutments disposed between the plurality of first and second pads.

6. The nozzle according to claim 1, wherein the inner wall comprises at least a one annular stiffener positioned facing at least one annular stiffener of the outer wall.

7. The nozzle according to claim 1, wherein the junction area of the inner and outer walls is located at a downstream section of the nozzle.

8. The nozzle according to claim 1, wherein the inner and outer walls include connecting plates at the junction area for connecting the inner and outer walls, the junction area including a plurality of openings separated by the connecting plates.

9. A turboprop engine within an unducted fan, comprising:
a nozzle disposed downstream from the unducted fan, the nozzle comprising:
an inner wall;
an outer wall being radially spaced apart from the inner wall and concentric with the inner wall; and
a junction area of the inner and outer walls, the junction area comprising a plurality of first pads secured to the inner wall, and a plurality of second pads secured to the outer wall and facing the plurality of first pads, wherein the plurality of first and second pads are positioned such that the plurality of first pads and the plurality of second pads are not in contact with each other to define a plurality of gaps therebetween when the turboprop engine is at a standstill and such that the plurality of second pads move toward the plurality of first pads to close the gaps to create bearing plane connections therebetween when the turboprop engine is in operation, the junction area being disposed at a trailing edge of the nozzle and comprising at least one opening to create ventilation between the inner and outer walls.

\* \* \* \* \*